(12) United States Patent
Holtgraver

(10) Patent No.: US 12,460,737 B2
(45) Date of Patent: Nov. 4, 2025

(54) LINE BREAK DEVICE

(71) Applicant: QTRCO, Inc., Tomball, TX (US)

(72) Inventor: Edward G. Holtgraver, Tomball, TX (US)

(*) Notice: Subject to any disclaimer, the term of this patent is extended or adjusted under 35 U.S.C. 154(b) by 0 days.

(21) Appl. No.: 18/772,454

(22) Filed: Jul. 15, 2024

(65) Prior Publication Data

US 2025/0020233 A1    Jan. 16, 2025

Related U.S. Application Data

(60) Provisional application No. 63/513,851, filed on Jul. 14, 2023, provisional application No. 63/513,850, filed on Jul. 14, 2023.

(51) Int. Cl.
*F16K 31/08* (2006.01)
*F16K 31/122* (2006.01)
*F16K 31/124* (2006.01)
*F16K 31/40* (2006.01)

(52) U.S. Cl.
CPC ........ *F16K 31/084* (2013.01); *F16K 31/1221* (2013.01); *F16K 31/1226* (2013.01); *F16K 31/1245* (2013.01); *F16K 31/40* (2013.01)

(58) Field of Classification Search
CPC ............... F16K 31/084; F16K 31/1221; F16K 31/1226; F16K 31/1245; F16K 31/40
USPC .......................................................... 137/456
See application file for complete search history.

(56) References Cited

U.S. PATENT DOCUMENTS

| | | | | |
|---|---|---|---|---|
| 1,617,156 A * | 2/1927 | Hardway | ................ | F16K 17/00 137/463 |
| 2,081,542 A * | 5/1937 | Kidney | ................. | E21B 43/017 251/32 |
| 2,586,249 A * | 2/1952 | Paille | ...................... | F23N 5/107 137/66 |
| 3,007,480 A * | 11/1961 | Stalnecker | ............ | F16K 17/164 251/25 |
| 3,227,171 A * | 1/1966 | Woelfel | .............. | F16K 31/1226 137/488 |
| 3,948,478 A * | 4/1976 | Vind | ........................ | F01D 17/26 415/17 |
| 8,783,644 B2 * | 7/2014 | Sun | ......................... | A62C 35/68 251/44 |
| 9,383,024 B2 * | 7/2016 | Giannotta | ............... | F16K 17/02 |
| 9,464,719 B2 * | 10/2016 | Holtgraver | ............ | F16J 15/028 |
| 10,927,858 B2 * | 2/2021 | Bell | .................. | F16K 31/52425 |
| 10,989,326 B2 * | 4/2021 | Rehhoff | ................ | F16K 31/124 |
| 11,041,575 B2 * | 6/2021 | Ishikawa | ............... | F16K 31/084 |
| 11,073,442 B2 * | 7/2021 | Glime, III | ............... | F15B 15/22 |
| 11,885,431 B2 * | 1/2024 | Ishikawa | ............... | B05B 1/3053 |
| 12,092,508 B2 * | 9/2024 | Friedl | ..................... | B05B 1/083 |
| 12,110,983 B2 * | 10/2024 | Krug | .................. | F16K 31/1221 |
| 12,370,084 B2 * | 7/2025 | Lin | ........................ | A61M 1/774 |

(Continued)

*Primary Examiner* — Umashankar Venkatesan
(74) *Attorney, Agent, or Firm* — Werner IP Law, P.C.

(57) ABSTRACT

The present invention is a device designed to sense changes in the pressure within pipelines containing gases or liquids and to provide a mechanical output upon rapidly decreasing pressure while providing no response when pressures change more slowly. The device employs magnetic forces to eliminate potential seal leakage from dynamic seals. Such a design offers environmental benefits with zero potential for leakage of pipeline gases or liquids into the atmosphere.

2 Claims, 2 Drawing Sheets

(56) References Cited

U.S. PATENT DOCUMENTS

2010/0229975 A1\* 9/2010 Sweeney ............... F15B 19/005
  137/556
2011/0252895 A1\* 10/2011 Kiesbauer ........... F16K 37/0091
  73/862.583
2011/0284083 A1\* 11/2011 Tondolo ................ F15B 20/002
  251/30.01

\* cited by examiner

LINE BREAK DEVICE

CROSS REFERENCE TO RELATED APPLICATION

This application claims priority to U.S. Application No. 63/513,851 filed on Jul. 14, 2023, and U.S. Application No. 63/513,850, filed on Jul. 14, 2023, the disclosures of which are incorporated herein by reference for all purposes.

FIELD OF THE INVENTION

The present invention relates to a device that controls the action of actuators and valves which are driven by the actuators, with the purpose of responding to sudden decreases in pipeline pressure, as would occur should the pipeline rupture.

BACKGROUND OF THE INVENTION

For several years, manufacturers have provided what are generally referred to as "gas over oil" actuating systems that utilize pipeline fluids and pressures to pressurize oil-containing chambers that supply this oil to actuators which in turn operate pipeline valves. When transferring oil form one tank to drive the actuator in a selected direction, the other side of the actuator is enabled to exhaust the oil back into the corresponding chamber. This is usually done by exhausting the pipeline media into the atmosphere.

Recent environmental concerns and regulations are causing manufacturers to seek ways to drive the actuators in a manner that will not exhaust any media to the atmosphere. In addition to actuation systems which do not inherently produce air pollution, manufacturers also require leak free systems to respond to pipeline breaks or ruptures. These systems react to pipeline media pressure in a manner, as achieved by the subject device, that will not allow leakage to the atmosphere.

Similar devices include a dynamically sealed rod which extends outward through a housing to activate a switch or a valve. For example, the Shafer™ automatic line break control uses a dynamically sealed rod (see Bulletin ALB-370-85, the disclosure of which is incorporated herein by reference for all purposes). The use of the dynamic seals though poses a risk of leakage as the seals wear down, which the present invention eliminates.

SUMMARY OF THE INVENTION

In one aspect, the present invention relates to a leak-free device which reacts to sudden losses of pipeline pressures and causes an actuator to close the pipeline and stop further flow/release of the pipeline media. Typically one pipeline valve will close to prevent additional media flowing toward the rupture, and a second valve, downstream of the rupture, will close to prevent back flow of media toward the rupture.

DETAILED DESCRIPTION OF PREFERRED EMBODIMENTS

Figure 1:
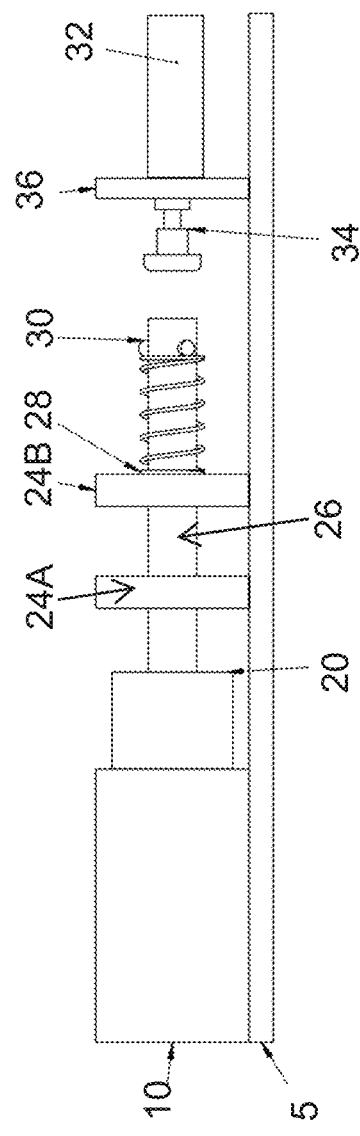
FIG. 1 depicts an elevational view of one embodiment of the present invention.

Embodiments of the invention are described more fully hereafter with reference to the accompanying drawings. Elements that are identified using the same or similar reference characters refer to the same or similar elements which perform the same functions across various embodiments. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 2:
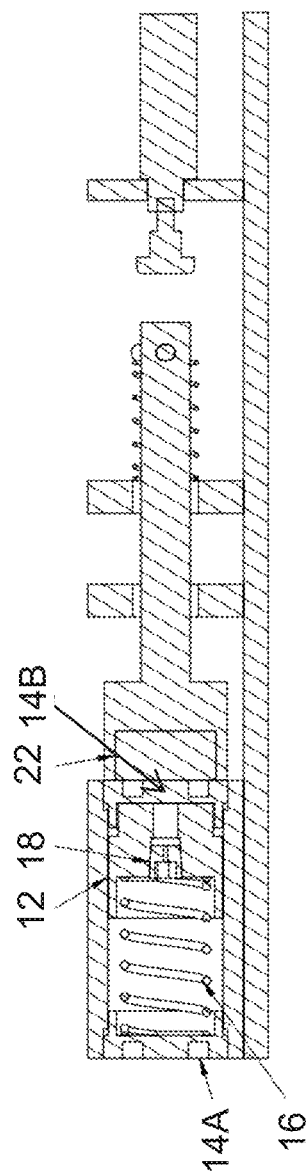
FIG. 2 is a cross-sectional view of FIG. 1.

Turning to FIGS. 1 and 2, there is shown one embodiment of the present invention, positioned on mounting base 5. Housing 10 holds the pipeline media. Inside housing 10 are disposed magnetic piston 12, first and second end caps 14A and 14B, a first spring 16, and a National Pipe Thread (NPT) plug/nipple 18. Magnet housing 20 holds magnet 22. Two guide plates 24A and 24B are positioned on base 5. Rod 26 attached to magnet housing 20 extends through openings in guide plates 24A and 24B. A second spring 28 is disposed on rod 26 between plate 24B and a pin 30. The system is positioned near a four-way manually actuated valve 32 held in place by mounting plate 36 and operated by a manual switch/button 34.

In operation, the magnetic force from magnet 22 attracts piston 12 which is formed from a magnetic material, thereby holding both magnet 22 and magnetic piston 12 against non-magnetic end cap 14B. First spring 16 assists with urging the magnetic piston 12 against the end cap 14B. Second spring 16 is biased to pull magnet housing 20 away from the end cap 14B, but is not of sufficient strength to overcome the magnetic forces between magnet 22 and magnetic piston 12.

Valve 32 is typically in position to cause the actuator to hold the pipeline valve in the open position. This is done by directing hydraulic fluid (e.g. hydraulic oil) through the valve and through a port in the actuator whereby the fluid holds the actuator in the pipeline valve open position. Force applied to switch 10 causes the valve 32 to change the flow of hydraulic fluid such that the actuator is caused to close the pipeline valve. It will be appreciated by those of ordinary skill in the art, that the exact configuration of the hydraulic flow will vary depending on whether the valve is double acting or single acting.

Housing 10 is connected by tubing (not shown) to the pipeline such that pipeline media (e.g., natural gas) and pressure flows into and fills the internal volume of housing 10. The pipeline media completely fills the internal volume, passing through plug/nipple 18 to fill both sides of the magnetic piston 12. Both ends of magnetic piston 12 being of the same surface area, the effect of this pipeline media yields zero net force on magnetic piston 12. An additional, separate housing may be added to increase the volume of media that passes through magnetic piston 12 to act as an added reservoir of media.

Figure 3:
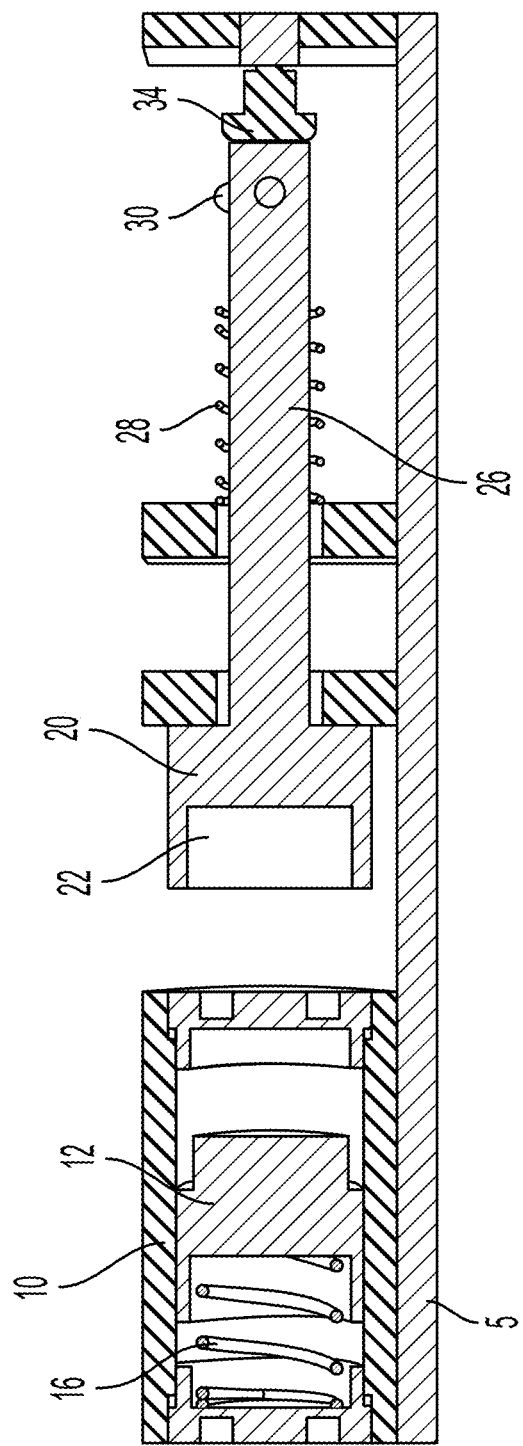
FIG. 3 depicts an elevational view of the system after a rapid decrease in pipeline pressure.

Being in open communication with the pipeline, pressure in the housing 10 will vary with changes in pipeline pressures. Slow pressure changes allow media to flow out of housing 10 as well as through magnetic piston 12. These minor differential pressures across the piston are insufficient to force magnetic piston 12 away from the force of magnet 22. A rapid decrease in pipeline pressure however causes a pressure imbalance across magnetic piston 12 as the pipeline media will quickly exhaust from the left side of the magnetic piston 12 but more slowly exhaust on the right side of the magnetic piston 12. Note, the references herein to "left" and "right" are with respect to the drawings. The exact orientation may vary upon installation of the system and the invention is not to be limited based on the directional descriptions herein. During a rapid decrease in pipeline pressure, the pressure differential is of a magnitude sufficient to break the magnetic attraction between magnetic piston 12 and magnet 22, thereby forcing magnetic piston 12 away from magnet 22 while also temporarily overcoming the force of first spring 16. Turning to FIG. 3, there is shown the result of the rapid pipeline pressure decrease. With magnetic piston 12 having moved away from magnet 22, the force of second spring 28 drives magnet housing 20 toward button 34, engaging button 34 and thereby triggering valve 32 and causing the actuator (not shown) to close the pipeline valve.

As the pressure becomes rebalanced across magnetic piston 12, first spring 16 pushes magnetic piston 12 to return to a position in contact with end cap 14B. However, magnet 22 and housing 20 do not return to having contact with the end cap 14B until they are manually repositioned by operating personnel. Thus, valve 32 remains in position holding the actuator in the pipeline valve closed position until valve 32 is manually returned (reset) to its original position allowing the opening of the pipeline valve. This ensures that the pipeline remains closed off while any repair/maintenance work is performed.

The system of the present invention provides for an immediate and automatic closure of the pipeline in case of a rupture. The system achieves the goal without exhausting any pipeline media into the atmosphere. The magnetic nature of the system requires no dynamic seals and thus is also leak-free.

It will be appreciated that the system of the present invention may include additional conduits, control mechanisms, and the like which are necessary for the operation thereof but which are well known to those skilled in the art and thus are not described herein.

Although specific embodiments of the invention have been described herein in some detail, this has been done solely for the purposes of explaining the various aspects of the invention and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

The invention claimed is:

1. A system for automatically closing off a pipeline in response to a rapid drop in pressure, the system comprising:
    a piston housing having a first end and a second end, said piston housing being in open communication with said pipeline whereby pressurized pipeline media flows into and fills said piston housing;
    a piston mounted in said piston housing, said piston being made of magnetic material, said piston dividing said piston housing into a first chamber proximate said first end of said piston housing and a second chamber proximate said second end of said piston housing;
    a nipple disposed in said piston to allow pipeline media to flow through said piston;
    a first spring disposed in said piston housing and biasing said piston toward said second end of said piston housing;
    a magnet housing having a first end and a second end, said first end of said magnet housing abutting said second end of said piston housing;
    a magnet disposed in said magnet housing;
    a rod extending from said second end of said magnet housing;
    a second spring disposed on said rod and biasing said magnet housing in a direction away from said piston housing;
    a manual valve operably connected to a pipeline valve and operative to trigger the opening or closing of said pipeline valve, said manual valve being triggered a button;
    whereby when the pressure of said pipeline media drops rapidly, said pipeline media is exhausted from said first piston chamber, and the pressure in said second piston chamber drives said piston in a direction away from said magnet; and
    whereby the movement of said piston away from said magnet releases said magnet such that said second spring then drives said rod into engagement with said button to trigger said manual valve to initiate closing of said pipeline valve.

2. The system of claim 1, whereby said first spring returns said piston to its original position.

* * * * *